(12) United States Patent
Poublon et al.

(10) Patent No.: US 6,295,806 B1
(45) Date of Patent: Oct. 2, 2001

(54) CATALYST TEMPERATURE MODEL

(75) Inventors: Mark J Poublon, Shelby Township; Steven R Mazure, Highland; James J Snyder, Farmington Hills; Danny K Schuelke, Grass Lake; Jayanthi Iyengar, Flushing; Gary R Oshnock, Oxford; Christopher P Thomas, West Bloomfield; James G Mazak, Utica, all of MI (US); Andrew C Bartlett, Westborough, MA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/543,123

(22) Filed: Apr. 5, 2000

(51) Int. Cl.$^7$ ........................................ F01N 3/00
(52) U.S. Cl. .............................. 60/274; 60/276
(58) Field of Search ............... 60/274, 276, 277, 60/285; 123/406.44, 480

(56) References Cited

U.S. PATENT DOCUMENTS

| | | | |
|---|---|---|---|
| 4,209,981 | 7/1980 | Miyamori et al. . | |
| 4,305,249 | * 12/1981 | Schmidt et al. | 60/274 |
| 4,319,451 | 3/1982 | Tajima et al. . | |
| 4,467,602 | * 8/1984 | Iizuka et al. | 60/285 |
| 4,542,728 | 9/1985 | Otobe et al. . | |
| 4,656,829 | 4/1987 | Creps et al. . | |
| 5,303,168 | * 4/1994 | Cullen et al. | 123/406.44 |
| 5,414,994 | * 5/1995 | Cullen et al. | 60/274 |
| 5,544,639 | 8/1996 | Shouda et al. . | |
| 5,606,855 | * 3/1997 | Tomisawa | 60/274 |
| 5,722,236 | * 3/1998 | Cullen et al. | 60/274 |
| 5,729,971 | * 3/1998 | Matsuno et al. | 60/277 |
| 5,746,049 | * 5/1998 | Cullen et al. | 60/274 |
| 5,802,844 | 9/1998 | Lee et al. . | |
| 5,832,721 | * 11/1998 | Cullen | 60/274 |
| 5,931,140 | * 8/1999 | Maloney | 123/480 |
| 5,956,941 | * 9/1999 | Cullen et al. | 60/274 |

* cited by examiner

*Primary Examiner*—Thomas Denion
*Assistant Examiner*—Tu M. Nguyen
(74) *Attorney, Agent, or Firm*—Mark P. Calcaterra

(57) ABSTRACT

A method for calculating the temperature of a catalyst in a catalytic converter. The method includes the steps of determining a first catalyst temperature; determining a stabilized catalyst temperature; and using the first catalyst temperature, the stabilized catalyst temperature and an update fraction to calculate an updated catalyst temperature.

22 Claims, 2 Drawing Sheets

CATALYST TEMPERATURE MODEL

CROSS-REFERENCE TO RELATED APPLICATIONS

Other features of the present invention are discussed and claimed in commonly assigned copending U.S. application Ser. No. 09/511,229 entitled "Model Based Enrichment For Exhaust Temperature Protection," filed Feb. 23, 2000.

BACKGROUND OF THE INVENTION

1. Technical Field

The present invention relates generally to the monitoring of internal combustion engines and more particularly to a method for predicting the temperature of a catalyst in a catalytic converter in real time based on the operating conditions of the vehicle.

2. Discussion

Catalytic converters are used to reduce major air pollutants, such as hydrocarbons, carbon monoxide and oxides of nitrogen, contained in the exhaust gas from an internal combustion engine of a motor vehicle. Each converter contains catalysts that produce an exothermic chemical reaction that transforms noxious pollutants into carbon dioxide, nitrogen, and water vapor. The catalytic converter is integrated downstream from the vehicle's engine into the vehicle's exhaust system.

The effectiveness of reducing pollutants by a catalytic converter is highly dependent on the temperature and total gas throughput, which in turn depends on the operational states and conditions of the internal combustion engine. The ability to determine the temperature of the catalyst permits the use of various control strategies that may minimize emissions and/or protect the catalyst from exposure to excessive temperatures. Accordingly, it is necessary to determine the temperature of a catalyst in a catalytic converter in a reliable and accurate manner.

SUMMARY OF THE INVENTION

It is one object of the present invention to provide a method for calculating the temperature of a catalyst in a catalytic converter.

It is a more specific object of the present invention to provide a method for calculating the temperature of a catalyst in a catalytic converter which takes into account various factors associated with the operation of a vehicle having a spark-ignited internal combustion engine.

In one form, the present invention provides a method for calculating the temperature of a catalyst in a catalytic converter. The method includes the steps of determining a first catalyst temperature; determining a stabilized catalyst temperature; and using the first catalyst temperature, the stabilized catalyst temperature and an update fraction to calculate an updated catalyst temperature.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
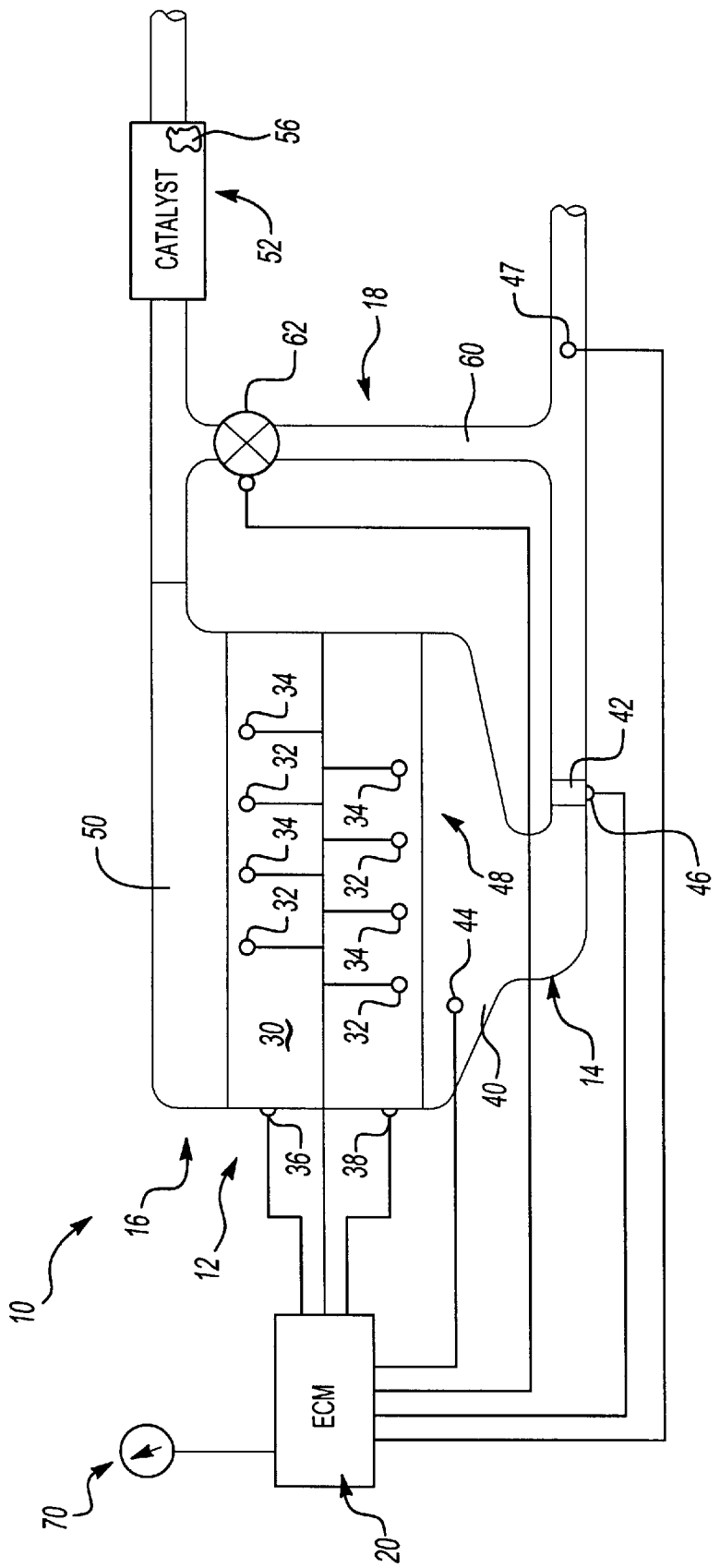
FIG. 1 is a schematic illustration of a portion of a vehicle constructed in accordance with the teachings of the present invention.

With reference to FIG. 1 of the drawings, a vehicle constructed in accordance with the teachings of the present invention is generally indicated by reference numeral 10. Vehicle 10 is shown to include an engine assembly 12, an air intake system 14, an exhaust system 16, an exhaust gas recirculation system 18 and a controller 20. Engine assembly 12 conventionally includes an internal combustion engine 30, a plurality of fuel injectors 32, a plurality of spark plugs 34, a knock sensor 36 and a crankshaft speed sensor 38.

Controller 20 is conventionally coupled to fuel injectors 32 to selectively control the magnitude of a fuel charge delivered to each of the cylinders of engine 30. Controller 20 is also conventionally coupled to spark plugs 34 to permit the spark delivery angle to be varied in a desired manner.

Knock sensor 36 is coupled to engine 30 and is operable for sensing vibrations associated with a knocking cylinder and producing a knock sensor signal in response thereto. Crankshaft speed sensor 38 is operable for sensing the rotational speed of the engine crankshaft (not specifically shown) and producing a speed signal in response thereto. Controller 20 receives knock sensor signal and speed signal.

Air intake system 14 is shown to include an intake manifold 40, a throttle 42, a manifold absolute pressure MAP sensor 44, a throttle position sensor 46 and an ambient air temperature sensor 47. Intake manifold 40 and throttle 42 are conventional in construction and operation and need not be discussed in detail. Briefly, throttle 42 is selectively positionable between a closed position which inhibits the flow of air into intake manifold 40, and an open position. Throttle 42 and the plurality of fuel injectors 32 cooperate to form a fuel/air delivery means 48 for selectively controlling a fuel/air ratio delivered to engine 30.

MAP sensor 44 is operable for sensing the pressure of a gas in the intake manifold 40 and producing a MAP sensor signal in response thereto. Throttle position sensor 46 is operable for sensing the amount by which throttle 42 is opened and producing a throttle position signal in response thereto. Ambient air temperature sensor 47 is operable for sensing the temperature of the air being drawn into air intake system 14 and producing an ambient air temperature signal in response thereto. Controller 20 receives the MAP signal, the throttle position signal and the ambient air temperature signal. Controller 20 is able to calculate the flow rate of air into engine 30 based on the signals from the sensors described above.

Exhaust system 16 includes an exhaust manifold 50 and a catalytic converter 52. Exhaust manifold 50 and catalytic converter 52 are conventional in their construction and operation and need not be discussed in detail. Briefly, exhaust manifold 50 directs exhaust gases into catalytic converter 52 where the exhaust gases contact a catalyst 56. If the temperature of catalyst 56 is above a predetermined light-off temperature, catalyst 56 participates in an exothermic reaction wherein noxious components of the exhaust gases are converted to carbon dioxide and water vapor. Controller 20 is able to calculate the flow rate of exhaust gases discharged from engine 30 since the intake air flow is known.

Exhaust gas recirculation system 18 includes a conduit 60 and a valve assembly 62. Conduit 60 couples valve assembly 62 to exhaust system 16 and air intake system 14. Controller 20 is operable for selectively controlling valve assembly 62 between an open position and a closed position to control an amount of exhaust gas input to air intake system 14. Controller 20 is also coupled to a plurality of vehicle sensors, such as vehicle speed sensor 70, and receives a plurality of sensor signals indicative of a plurality of vehicle dynamics, such as the vehicle speed.

Figure 2:
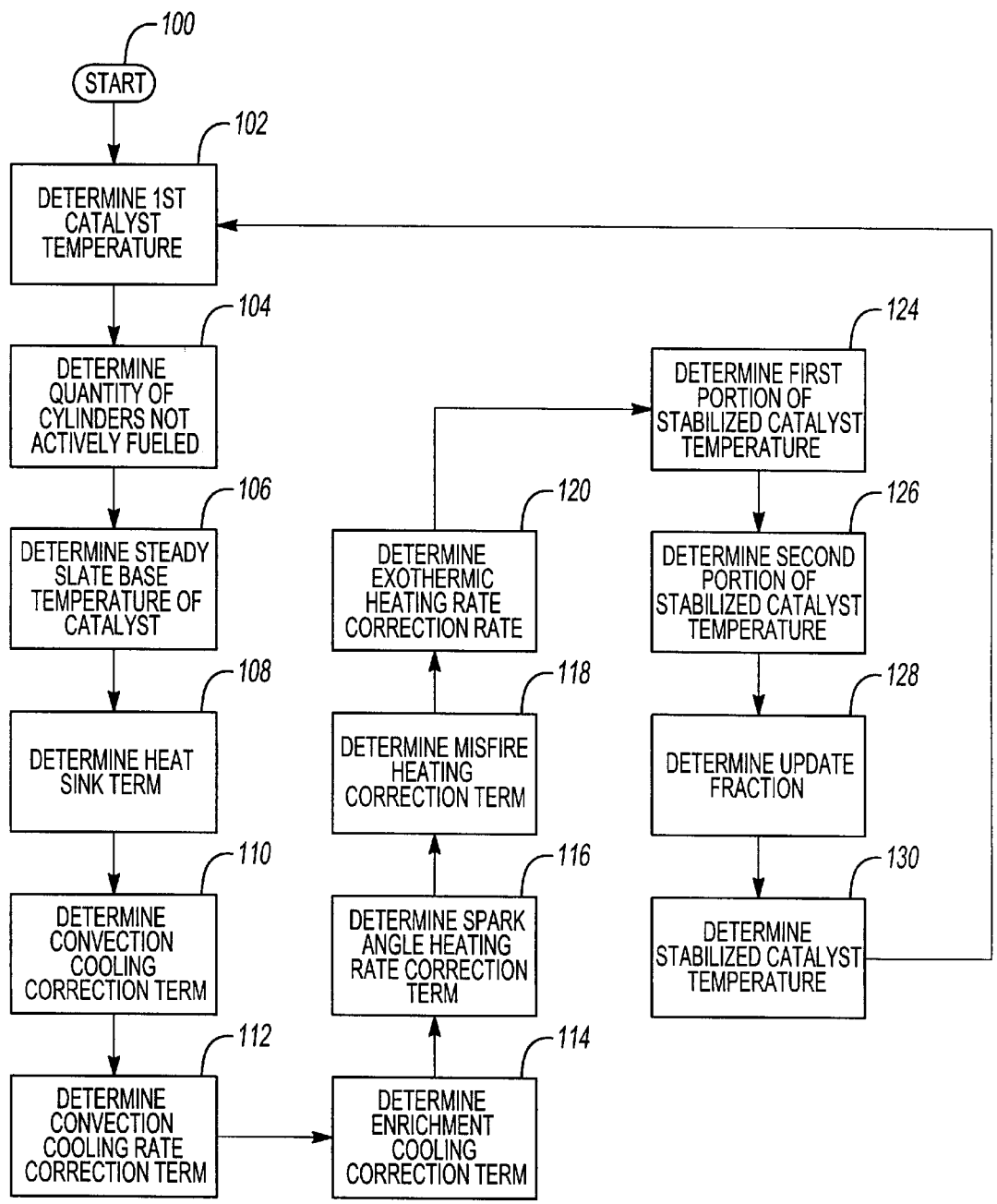
FIG. 2 is a schematic illustration of the method of the present invention in flow chart form.

In FIG. 2, the method of the present invention is illustrated in flowchart form. The method is entered at bubble 100 and proceeds to block 102 where the methodology determines a first catalyst temperature. If the updated catalyst temperature is known from a previous iteration of the methodology and engine assembly 12 has not been turned off, the methodology will set the first catalyst temperature equal to the updated catalyst temperature in block 102.

Otherwise, the methodology will set the first catalyst temperature equal to an initialized startup value which has been calculated from a model that considers the value of last catalyst temperature that had been calculated, the ambient air temperature and the elapsed time since the calculation of the last catalyst temperature. Accordingly, the initialized startup value may be calculated according to the following formula:

$$T(ISUV)=T(LCCT)-\{[T(LCCT)-T(AMB)]\times CDF\}$$

where:

T(ISUV)=the initialized startup value;

T(LCCT)=the last calculated catalyst temperature;

T(AMB)=the ambient air temperature; and

CDF=a cool down fraction which approximates how completely the catalyst 56 has cooled down based upon the elapsed time since the calculation of the last catalyst temperature.

The methodology next proceeds to block 104 where the methodology determines the quantity of cylinders which are not being actively fueled, as when engine 30 is being used as an air pump to decelerate the vehicle or to provide greater fuel economy. The methodology then proceeds to block 106.

In block 106 the methodology next determines a steady state base temperature of catalyst 56. The steady state base temperature is related to both the amount of heat which is directed to catalyst 56 and the amount of heat generated by catalyst 56 at the present condition under which vehicle 10 is being operated. In the particular embodiment disclosed data for the steady state base temperature is provided in tabular form and is based on the manifold absolute pressure and the engine rotational speed.

The methodology next proceeds to block 108 where a heat-sink term is calculated. The heat-sink term reflects the loss of heat from the exhaust gas to the exhaust system 16 after vehicle 10 is started. The heat sink term is initialized at the start-up of the vehicle 10 and is based on the amount of time since the engine assembly 12 had last been operated (i.e., the length of time the engine assembly 12 had been off). The heat sink term decays to a value of zero at a rate based on the flow rate of exhaust gases discharged from engine 30. The methodology next proceeds to block 110.

In block 110 the methodology calculates a convection cooling correction term based on the speed of vehicle 10 as sensed by vehicle speed sensor 70. The convection cooling correction term takes into consideration the fact that heat will be released from the catalytic converter 52 to the environment through convection cooling when vehicle 10 is being operated and that the amount of heat that is released will be approximately proportional to the speed of vehicle. The methodology next proceeds to block 112.

In block 112 the methodology determines the ambient air temperature as sensed by ambient air temperature sensor 47.

The methodology then calculates the difference between a reference temperature and the ambient temperature and uses this difference to calculate an ambient cooling correction term. The ambient cooling correction term takes into consideration the fact that the data for the steady state base temperature is based on data taken at a predetermined ambient temperature such as 70° F. Accordingly, the ambient cooling correction term compensates for the variances in the convection cooling correction term that result when the ambient temperature varies from the predetermined ambient temperature at which the data for the steady state base temperature was taken. In the particular embodiment illustrated, the ambient cooling correction term is determined by multiplying the difference between a reference temperature and the ambient temperature by a predetermined ambient correction gain.

The methodology next proceeds to block 114 where the methodology determines an actual fuel/air ratio, calculates the difference between a stoichiometric fuel/air ratio and the actual fuel/air ratio and uses the difference between the stoichiometric fuel/air ratio and the actual fuel/air ratio to calculate an enrichment cooling correction term. The enrichment cooling correction term takes into consideration the heat that is absorbed by unburned fuel that exits the engine 30. In the particular embodiment illustrated, the enrichment cooling correction term is determined by multiplying the absolute value of the difference between the stoichiometric fuel/air ratio and the actual fuel/air ratio by a predetermined fuel/air correction gain.

The methodology then proceeds to block 116 where the methodology calculates a spark angle heating rate correction term. The methodology initially determines a theoretical spark delivery angle that provides a maximum brake torque. The methodology next determines an actual spark delivery angle which may be the most recent spark delivery angle used or an average spark delivery angle as applied to several of the spark plugs 34. The methodology then calculates a difference between the theoretical spark delivery angle and the actual spark delivery angle and uses this difference to calculate a spark angle heating rate correction term. The spark angle heating rate correction term takes into account that as the actual spark delivery angle moves away from the theoretical spark delivery angle for maximum brake torque, less energy from the combustion of a fuel charge is being used in the engine 30 for work (i.e., to push the pistons and rotate the crankshaft) and more energy is being used for the production of heat. In the particular embodiment illustrated, the spark angle heating rate correction term is determined by multiplying the difference between the theoretical spark delivery angle and the actual spark delivery angle by a predetermined spark correction gain. The methodology next proceeds to block 118.

In block 118 the methodology calculates a misfire heating correction term. The methodology initially determines the rate at which the engine 30 is misfiring and uses this rate to calculate the misfire heating correction term. Accordingly, the misfire heating correction term takes into account the absence of combustion in a cylinder that is misfiring and the associated increase in the amount of chemical energy rejected by the engine 30 in the exhaust gases. In the particular embodiment illustrated, the misfire heating correction term is determined by multiplying the rate of misfire by a predetermined misfire correction gain.

The methodology next proceeds to block 120 where the methodology determines if an exothermic heating rate correction term is to be excluded. The exothermic heating rate correction term compensates for the quantity of heat produced by the exothermal reaction within the catalytic converter 52; the exothermal reaction, however, will only take place if the temperature of catalyst 56 is over a predetermined catalyst light-off temperature. Accordingly, the methodology first determines if the first catalyst temperature (as determined at block 102) exceeds a predetermined catalyst light-off temperature. If the first catalyst temperature exceeds the predetermined catalyst light-off temperature, the exothermic heating rate correction term is set to a first predetermined value, such as zero. If the first catalyst temperature does not exceed the predetermined catalyst light-off temperature, the exothermic heating rate correction term is set to a second predetermined value. The methodology next proceeds to block 124.

The methodology next proceeds to block 124 where a first portion of the stabilized catalyst temperature is calculated. The stabilized catalyst temperature is the temperature that the catalyst would stabilize at if the present operating conditions were held constant for a sufficient amount of time. Accordingly, the stabilized catalyst temperature is not necessarily equal to the temperature of the catalyst. The methodology initially sums the steady state base temperature with the heat-sink term, the convection cooling correction term, the ambient cooling correction term, the enrichment cooling correction term, the spark angle heating rate correction term, the misfire heating correction term and the exothermic heating rate correction term. This sum is then multiplied by the fraction of cylinders which are being actively fueled. The fraction of cylinders which are being actively fueled is equal to the quantity of 1-[(the quantity of cylinders not being actively fueled)/(the total quantity of cylinders)].

The methodology next proceeds to block 126 where a second portion of the stabilized catalyst temperature is calculated. The second portion of the stabilized catalyst temperature is based on the fraction of cylinders which are not being actively fueled. The fraction of cylinders which are not being actively fueled is equal to the quantity of cylinders not being actively fueled divided by the total quantity of cylinders. This fraction is multiplied by the temperature of the air after it is pumped through the engine 30. The methodology then proceeds to block 128.

In block 128 the methodology determines an update fraction. The update fraction controls the rate of change of the catalyst temperature from the present value to the stabilized catalyst temperature. In the particular embodiment disclosed, the update fraction is based on the flow rate of exhaust gases discharged from engine 30 and the throttle state (i.e., whether the throttle is open or closed). The methodology next proceeds to block 130.

In block 130, the methodology calculates an updated catalyst temperature. The updated catalyst temperature is equal to the quantity of {[(the first portion of the stabilized catalyst temperature)+(the second portion of the second stabilized catalyst temperature)]×(update fraction)}+{(the first catalyst temperature)×[1–(the update fraction)]}. The methodology then loops back to block 102.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A method for monitoring the temperature of a catalyst in a catalytic converter in an exhaust system, the method comprising the steps of:

determining a first catalyst temperature;

determining a stabilized catalyst temperature which includes the steps of determining a quantity of unfueled engine cylinders, and calculating a term to account for a quantity of air pumped through an engine without a corresponding release of combustion energy based on the quantity of unfueled engine cylinders; and determining an updated catalyst temperature based on the first catalyst temperature, the stabilized catalyst temperature and an update fraction.

2. The method of claim 1, wherein the update fraction is based on a flow of gas through the catalyst and a throttle state.

3. The method of claim 1, wherein the step of determining the stabilized catalyst temperature includes the step of determining a steady state base temperature of the catalyst, the steady state base temperature being based on a manifold absolute pressure and an engine rotational speed.

4. The method of claim 1, wherein the step of determining the stabilized catalyst temperature includes the step of determining a convection cooling correction term based on a vehicle speed.

5. The method of claim 1, wherein the step of determining the stabilized catalyst temperature further includes the steps of:

determining an ambient air temperature;

calculating a difference between a reference temperature and the ambient air temperature; and calculating an ambient cooling correction term based on the difference between the reference temperature and the ambient air temperature.

6. The method of claim 1, wherein the step of determining the stabilized catalyst temperature includes the step of determining a heat-sink term to account for an amount of heat retained by the exhaust system.

7. The method of claim 1, wherein the step of determining the stabilized catalyst temperature includes the steps of:

determining an actual fuel/air ratio;

calculating a difference between a stoichiometric fuel/air ratio and the actual fuel/air ratio; and calculating an enrichment cooling correction term based on the difference between the stoichiometric fuel/air ratio and the actual fuel/air ratio.

8. The method of claim 1, wherein the step of determining the stabilized catalyst temperature includes the steps of:

determining a theoretical spark delivery angle that provides a maximum brake torque;

determining an actual spark delivery angle;

calculating a difference between the theoretical spark delivery angle and the actual spark delivery angle; and calculating a spark angle heating rate correction term based on the difference between the theoretical spark delivery angle and the actual spark delivery angle.

9. The method of claim 1, wherein the step of determining the stabilized catalyst temperature includes the steps of:

determining a rate of misfire; and calculating a misfire heating correction term based on the rate of misfire.

10. The method of claim 1, wherein the step of determining the stabilized catalyst temperature includes the steps of:

determining if the first catalyst temperature exceeds a predetermined catalyst light-off temperature; and if the first catalyst temperature does not exceed the predetermined catalyst light-off temperature, excluding an exothermic heating rate correction term to compensate for a quantity of heat not produced by an exothermic reaction within the catalytic converter.

11. The method of claim 1, wherein the step of determining a first catalyst temperature includes the steps of:

determining if the catalytic converter has been continuously used;

if the catalytic converter has been continuously used, setting the first catalyst temperature equal to the updated catalyst temperature calculated in an iteration of the method immediately preceding the present iteration; and otherwise, calculating the first catalyst temperature with a model that considers the updated catalyst temperature calculated in a last iteration of the method immediately prior to a time at which the catalytic converter was not being used, an ambient air temperature and an amount by which the catalyst has cooled.

12. The method of claim 11, wherein the step of calculating the first catalyst temperature with the model includes the steps of:

calculating a first intermediate quantity by subtracting the ambient air temperature from the updated catalyst temperature calculated in the iteration of the method immediately preceding the present iteration;

calculating a second intermediate quantity by multiplying the first intermediate quantity by a cool down fraction that approximates an amount by which the catalyst has cooled down based on a length of time for which the catalytic converter was not being used; and calculating the first catalyst temperature by subtracting the second intermediate quantity from the updated catalyst temperature calculated in the iteration of the method immediately preceding the present iteration.

13. A method for monitoring the temperature of a catalyst in a catalytic converter of an exhaust system, the method comprising the steps of:

determining a first catalyst temperature;

determining a first portion of a stabilized catalyst temperature based on a quantity of fueled engine cylinders and a steady state base temperature of the catalyst, the steady state base temperature based on a manifold absolute pressure and an engine rotational speed;

determining a second portion of the stabilized catalyst temperature based on a quantity of unfueled engine cylinders; and calculating an updated catalyst temperature based on the first catalyst temperature, the first and second portions of the stabilized catalyst temperature and an update fraction.

14. The method of claim 13, wherein the step of determining the first portion of the stabilized catalyst temperature further includes the steps of:

determining a convection cooling correction term based on a vehicle speed; and adding the convection cooling correction term to the steady state base temperature.

15. The method of claim 13, wherein the step of determining the first portion of the stabilized catalyst temperature further includes the steps of:

determining an ambient air temperature;

calculating a difference between a reference temperature and the ambient air temperature;

calculating an ambient cooling correction term based on the difference between the reference temperature and the ambient air temperature; and adding the ambient cooling correction term to the steady state base temperature.

16. The method of claim 13, wherein the step of determining the first portion of the stabilized catalyst temperature includes the steps of:

determining a heat-sink term to account for an amount of heat retained by the exhaust system; and adding the heat-sink term to the steady state base temperature.

17. The method of claim 13, wherein the step of determining the first portion of the stabilized catalyst temperature includes the steps of:

determining an actual fuel/air ratio;

calculating a difference between a stoichiometric fuel/air ratio and the actual fuel/air ratio;

calculating an enrichment cooling correction term based on the difference between the stoichiometric fuel/air ratio and the actual fuel/air ratio; and adding the enrichment cooling correction term to the steady state base temperature.

18. The method of claim 13, wherein the step of determining the first portion of the stabilized catalyst temperature includes the steps of:

determining a theoretical spark delivery angle that provides a maximum brake torque;

determining an actual spark delivery angle;

calculating a difference between the theoretical spark delivery angle and the actual spark delivery angle;

calculating a spark angle heating rate correction term based on the difference between the theoretical spark delivery angle and the actual spark delivery angle; and adding the spark angle heating rate correction term to the steady state base temperature.

19. The method of claim 13, wherein the step of determining the first portion of the stabilized catalyst temperature includes the steps of:

determining a rate of misfire;

calculating a misfire heating correction term based on the rate of misfire; and adding the misfire heating correction term to the steady state base temperature.

20. The method of claim 13, wherein the step of determining the first portion of the stabilized catalyst temperature includes the steps of:

determining if the first catalyst temperature exceeds a predetermined catalyst light-off temperature; and if the first catalyst temperature does not exceed the predetermined catalyst light-off temperature, subtracting an exothermic heating correction term from the steady state base temperature, the exothermic heating correction term compensating for a quantity of heat not produced by an exothermic reaction within the catalytic converter.

21. The method of claim 13, wherein the step of determining a first catalyst temperature includes the steps of:

determining if the catalytic converter has been continuously used;

if the catalytic converter has been continuously used, setting the first catalyst temperature equal to the updated catalyst temperature calculated in an iteration of the method immediately preceding the present iteration; and otherwise, calculating the first catalyst temperature with a model that considers the updated catalyst temperature calculated in a last iteration of the method immediately prior to a time at which the catalytic converter was not being used, an ambient air temperature and an amount by which the catalyst has cooled.

22. The method of claim 21, wherein the step of calculating the first catalyst temperature with the model includes the steps of:

calculating a first intermediate quantity by subtracting the ambient air temperature from the updated catalyst temperature calculated in the iteration of the method immediately preceding the present iteration;

calculating a second intermediate quantity by multiplying the first intermediate quantity by a cool down fraction which approximates an amount by which the catalyst has cooled down based on a length of time for which the catalytic converter was not being used; and calculating the first catalyst temperature by subtracting the second intermediate quantity from the updated catalyst temperature calculated in the iteration of the method immediately preceding the present iteration.

* * * * *